United States Patent [19]
Wilkerson et al.

[11] Patent Number: 5,409,512
[45] Date of Patent: Apr. 25, 1995

[54] AIR FILTRATION SYSTEM

[75] Inventors: Kenneth R. Wilkerson, Centralia; Donald W. Thomack, Walnut Hill, both of Ill.

[73] Assignee: Commerical Sweeper Systems, Inc., Centralia, Ill.

[21] Appl. No.: 150,698

[22] Filed: Nov. 10, 1993

[51] Int. Cl.$^6$ ............................................. B01D 46/00
[52] U.S. Cl. ................... 55/302; 15/340.1; 55/324; 55/325; 55/337; 55/356; 55/447; 55/498
[58] Field of Search ...................... 15/340.1, 352, 353; 55/302, 320, 321, 323, 324, 325, 337, 356, 447, 498

[56] References Cited

U.S. PATENT DOCUMENTS

| | | |
|---|---|---|
| 2,985,771 | 5/1961 | Halpern . |
| 3,053,030 | 9/1962 | Smith . |
| 3,097,936 | 7/1963 | Lincoln . |
| 3,102,208 | 8/1963 | Reach, Jr. . |
| 3,303,416 | 2/1967 | Paice et al. . |
| 3,513,638 | 5/1970 | Young . |
| 3,541,631 | 11/1970 | Kluge et al. . |
| 3,581,115 | 5/1971 | Weber . |
| 3,582,686 | 6/1971 | Perkins . |
| 3,594,992 | 7/1971 | Carr ............................. 55/302 |
| 3,630,004 | 12/1971 | Adair et al. . |
| 3,680,285 | 8/1972 | Wellan et al. . |
| 3,721,908 | 3/1973 | Jurjans . |
| 3,842,461 | 10/1974 | Wurster ...................... 15/340.1 |
| 3,870,489 | 3/1975 | Shaddock ..................... 55/356 |
| 3,893,833 | 7/1975 | Ulvestad . |
| 4,007,026 | 2/1977 | Groh ............................ 55/356 |
| 4,044,422 | 8/1977 | Larsen ....................... 15/340.1 |
| 4,173,722 | 11/1979 | Detering . |
| 4,191,998 | 3/1980 | Carmody . |
| 4,218,227 | 8/1980 | Frey ............................. 55/302 |
| 4,223,748 | 9/1980 | Barendsen . |
| 4,227,893 | 10/1980 | Shaddock ..................... 55/356 |
| 4,289,511 | 9/1981 | Johnson, Jr. .................. 55/302 |
| 4,384,874 | 5/1983 | Dattilo . |
| 4,514,875 | 5/1985 | Comer ......................... 55/302 |
| 4,645,520 | 2/1987 | Huttlin ......................... 55/302 |
| 4,666,472 | 5/1987 | Klimczak et al. .............. 55/302 |
| 4,802,983 | 2/1989 | Howeth ........................ 55/302 |
| 4,836,834 | 6/1989 | Steele .......................... 55/302 |
| 4,961,762 | 10/1990 | Howeth ........................ 55/302 |
| 5,062,868 | 11/1991 | Kennedy ....................... 55/356 |
| 5,120,333 | 6/1992 | Davis ........................... 55/356 |
| 5,249,332 | 10/1993 | Wilkerson . |

FOREIGN PATENT DOCUMENTS

| | | |
|---|---|---|
| 2302632 | 9/1976 | France . |
| 455489 | 3/1975 | U.S.S.R. . |
| 557507 | 6/1977 | U.S.S.R. . |

*Primary Examiner*—Charles S. Bushey
*Attorney, Agent, or Firm*—Kalish & Gilster

[57] ABSTRACT

An air filtration system for use in capturing fugitive dust in industrial sweeping operations includes a hopper having internal structure for causing change in the direction of flow of suction air which enters the hopper along with debris collected during an industrial sweeping operation. A plurality of filters is disposed within the hopper for filtering the suction air, each one of the plurality of filters having filter media therein which can be repeatedly purged for cleaning and continuous reuse thereof. Structure is included for providing repeated purging blasts of air to the plurality of filters, and structure is associated with each one of the plurality of filters for causing the purging blasts of air to clean substantially the entire filter media of each one of the filters. The system also includes structure for creating suction air which is pulled through the hopper and the filters disposed therein before exit of the suction air from the hopper substantially free from debris, particulate matter and fugitive dust which is collected by the system.

12 Claims, 2 Drawing Sheets

AIR FILTRATION SYSTEM

BACKGROUND AND SUMMARY OF THE INVENTION

The present invention relates generally to the field of dust removal from air, and, more particularly, to a new air filtration system for use in combination with an industrial sweeping and collection device for filtering dust from air pulled by high speed air flow through the collection device before exhausting the air therefrom.

Heretofore, industrial sweeper and scrubber machines existed for cleaning of large areas such as railroad tracks and pavement surfaces. In operation of such machines dirt and debris were collected by various means and mechanically or otherwise moved to a bin or hopper for temporary storage or transport. These machines traditionally had no provision whatsoever for dust control. Accordingly, the large quantities of airborne dust inherently created in such cleaning operations were an inconvenience and a health hazard for the operator of the machine, as well as other persons in the nearby vicinity of its operation.

With the advent of workers' compensation and clean air laws, as well as generally increased public health awareness, it has become desirable to include in industrial scrubbing and sweeping equipment some adaptation for eliminating fugitive dust raised in the sweeping operation, for the health of the operator of the equipment as well as to keep air pollution generally at a low level. One such adaptation was to use large quantities of water to dampen the surface being cleaned. This method proved to be messy and wasteful of both water and fuel. Water sprayed on the surface created mud that remained as the sweeper moved on, and increased fuel was necessary to transport the water.

Thus it was desired to develop a dust control system which did not make use of water and which was adaptable at least to some pre-existing sweeper machines. Previously, air filtration systems of various types have been known for use in particular industrial situations. Some industrial applications, including for example, certain railroad track and pavement sweepers, as well as some mining operations have used drum-type pleated paper filters with limited success.

These known filtration systems all have suffered from certain drawbacks which have made use thereof at least troublesome and inefficient. Of particular concern have been limitations on air flow rate through the filters and clogging of the filter media with fine particulate matter which is filtered from the system's exhaust air flow. Of course, as the porous membrane of a filter becomes blocked the flow of air therethrough becomes less and less efficient until the filter becomes essentially non-functional.

And, although previous attempts have been made at developing air filtration systems in which the filter media can be purged by backward flushing with bursts of air, to clear the media pores of blockage, these attempts have been unsatisfactory with regard to the thoroughness of the purging and the overall efficiency of the air filtration system, particularly in terms of volume of air filtered per unit time.

Accordingly, the new air filtration system addresses these past problems by provision of a particular arrangement of redesigned filter units mounted within a debris collection hopper having a unique wall arrangement therein which is particularly advantageous when used in combination with such redesigned filter units. Further, the new design of the barrel-type air filters and the particular arrangement thereof, along with a purge air diffuser adaptation, permits the filters to be much more thoroughly purged than previously possible. Consequently, the enhanced filter purging permits the new air filtration system as a whole to be much more effective in cleansing large volumes of air drawn through the sweeper unit.

Thus, it is an object of the present invention to provide an air filtration system for use in a sweeping device, which filtration system provides superior cleansing of a large volume of air at a high rate of speed on a constant basis while using a minimum amount of filtration substrate material.

It is further among the objects of the present invention, having the features enumerated, that means are provided for particularly proficient purging of the filters of the new system by selectively timed, strong bursts of air in a flow direction opposite to the normal filtration air flow direction.

It is also among the objects of the present invention, having the above-mentioned features, that the new air filtration system be structured in a such a manner as to enable improved economy of manufacture thereof.

Accordingly, in furtherance of the above objects, the present invention is, briefly, an air filtration system for use in capturing fugitive dust in industrial sweeping operations. The system includes a hopper having internal structure for causing change in the direction of flow of suction air which enters the hopper along with debris collected during an industrial sweeping operation. The system also has a plurality of filters disposed within the hopper for filtering the suction air. Each one of the plurality of filters has filter media therein which can be repeatedly purged for cleaning and continuous reuse thereof. And the system is adapted for providing repeated purging blasts of air to the plurality of filters. Also in the system is structure associated with each one of the plurality of filters for causing the purging blasts of air to clean substantially the entire filter media of each one of the filters, and structure for creating suction air which is pulled through the hopper and the filters disposed therein before exit of the suction air from the hopper substantially free from debris, particulate matter and fugitive dust which is collected by the system.

The invention is also, briefly, the system described wherein the hopper is enclosed and has a right side wall and a left side wall, with respect to the position of an operator of the system, a front wall and a rear wall; a floor and a roof, and wherein the internal structure in the hopper for causing change in direction of the suction air includes an arrangement of walls disposed within the hopper in transverse relationship to the longitudinal axis thereof.

The invention is further, briefly, the system described, wherein the arrangement of walls includes a first wall, a second wall and a third wall disposed in relationship to each other so as to cause the suction air flow to change in direction to such a degree as to, in combination with the effect of gravity, cause large pieces of debris and relatively smaller particulate matter to be removed from the flow of suction air prior to contacting the plurality of filters disposed within the hopper.

Moreover, the invention is, briefly, for use in an industrial sweeping apparatus for capturing fugitive dust created by the sweeping process, wherein the sweeping apparatus has debris collection structure for transfer of debris from a sweeping portion to a hopper portion, and an air filtration system which includes structure for creating suction air flow, structure for changing the direction of suction air flow, to thereby enhance removal of large debris and particulate matter from the suction air, filters for removal of dust and fine particulate matter from the suction air flow, structure for automatically purging the entire filters of dust and fine particulate matter removed from the suction air flow, and structure for removing the filtered suction air from the system.

Further objects will be in part apparent and in part pointed out hereinbelow.

BRIEF DESCRIPTION OF THE DRAWINGS

Throughout the drawings like parts are indicated by like element numbers.

DESCRIPTION OF THE PREFERRED EMBODIMENT

Figure 1:
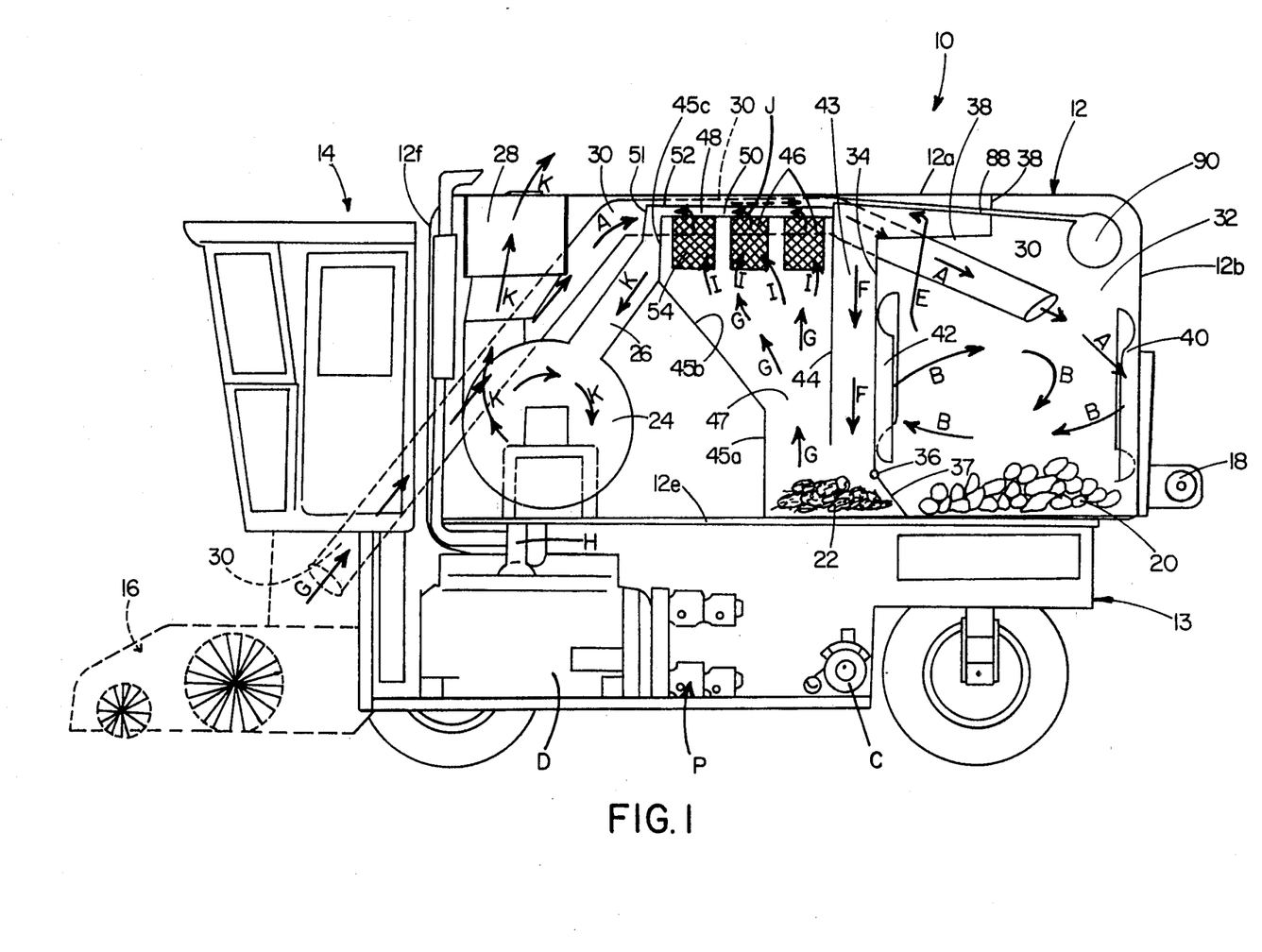
FIG. 1 is a schematic side elevational view of a sweeping and debris collection device having an air filtration system therein structured in accordance with and embodying the present invention.

With reference to the drawings, and as shown in FIG. 1, 10 generally indicates an automated, mobile sweeping and debris collection device having a hopper portion 12 which is mounted on a chassis 13 and moved about by a driver-operated prime mover 14, having the usual diesel engine D, pumps and drive gear P and an air compressor C. Sweeping apparatus 10 includes a sweeping portion 16 attached thereto (shown in phantom) for collecting and urging debris toward the hopper.

Hopper 12 has a substantially hollow interior, for containment of various elements of the system and for storage of collected debris therein, and which is generally defined by a roof 12a, a rear wall 12b, right and left side walls 12c, 12d, respectively (directions being with respect to a driver, not shown, of sweeper 10), floor 12e, and front wall 12f.

Sweeping portion 16 may be of many different types, but is preferably structured similarly to the Pavement Sweeper disclosed in U.S. Pat. No. 5,249,332, which issued Oct. 5, 1993 to the inventor herein. Likewise, prime mover 14 can vary in type and style, as will be clear from the following description of the new air filtration system.

The hopper portion 12 of sweeper 10 is preferably of the variety which can be caused by use of hydraulic cylinder means H to tilt upwardly and rearwardly when desired to completely dump debris out of the hopper. Ordinarily an unloading auger 18 of the screw variety is mounted at the bottom, rear of hopper 12 to facilitate removal therefrom of collected dust and debris. For purposes of this discussion, larger, heavier debris is indicated in FIG. 1 at 20, and finer, dusty is indicated at 22.

A large fan 24 of known variety for creating suction air is mounted in the usual manner, ordinarily on one side and forwardly within the side walls of hopper 12. In the embodiment illustrated fan 24 is mounted just rearwardly of the cab of the prime mover 14 and on the operator's right. Fan 24 has an inflow duct 26 and an outflow duct 28 and preferably remains in position on chassis 13 when hopper 12 is tilted for dumping, as is the usual case. Inflow duct 26 has an opening (not seen) which becomes exposed when hopper 12 tilts away from chassis 13. A rubber gasket (not shown) creates a seal around the open edge of duct 26 for snugly resealing the opening when the hopper tilts back down to normal horizontal working position.

Under force of the high speed air movement created by fan 24, sweeper 16 passes collected dirt, rubble, debris, etc. via a large diameter collection tube 30 which extends from sweeper 16 upwardly into hopper 12, continues along one side wall (shown here on the operator's right) just beneath the roof of the hopper and then angles downwardly and rearwardly for deposit of collected materials 20 therethrough into a large volume, rearwardly disposed main debris bin 32.

Collection tube 30 is preferably generally oval in cross-section with dimensions of approximately 13 inches at its highest point and about eight inches in width. Of course, a round or rectangular cross-sectioned tube would suffice. Throughout the following discussion of the interior structure of hopper 12 it is understood that where necessary the following structures are adapted to permit passage therethrough or adjacently of collection tube 30 without inhibiting the required or desired function of the structure described.

Within the interior of hopper 12 there is provided certain structure for changing the direction of suction air flow to facilitate removal therefrom, with the help of gravity, of large debris, smaller particulate matter, and even smaller fine dust particles. The air flow changing structure will be defined hereafter with regard to its positioning within hopper 12.

Bin 32 is defined by roof 12a, rear wall 12b, side walls 12c, 12d, floor 12e, and a transversely disposed substantially vertical interior wall 34 positioned forwardly of rear wall 12b and more or less parallel in relation thereto.

Wall 34 extends entirely across the interior width of hopper 12 between side walls 12a, 12b, but is interrupted at its upper and lower extremes. At its lower end, wall 34 connects by a hinge 36 to a lower flap-like plate or "door" 37 which is substantially equal in width to wall 34 and extends contiguously therewith across the interior of hopper 12. Hinged plate 37 is approximately 12 inches high and is positioned at an angle, so as to extend into bin 32 and intersect at its free, bottom edge floor 12 upon which it rests.

At its upper end interior wall 34 terminates spacedly beneath roof 12a and intersects along its entire width a forward end of a heavy, large mesh grid 38 formed of extruded metal (shown only from the edge in FIG. 1). Grid 38 extends rearwardly, parallel to and beneath roof 12a for a distance of approximately 36 inches and then turns upwardly to intersect and connect to the inside surface of roof 12a. So formed, grid 38 permits passage therethrough of air, dust and some particulate matter 22, but will not allow passage of large pieces of debris 20.

On the interior, bin-facing surfaces of rear wall 12b and interior transverse wall 34 are deflection shields 40, 42, respectively, which face each other and which are attached to their corresponding walls along the central longitudinal axes of the shields, for example by L-brackets. Two opposed, vertically disposed longitudinal edges of shields 40 curve gently, inwardly, so that the shields open concavely toward the middle of bin 32. The rearwardly directed end of collection tube 30 is aimed generally toward shield 40. Thus as suction air is pulled through tube 30 in the direction indicated by arrows A, it exits and at least a portion of it strikes curved shield 40 which deflects the air flow generally toward the sides or periphery of bin 32, forwardly toward shield 42, so that in part due to the velocity and volume of air being pulled through the system, a vortex, generally indicated by arrows B, is formed. If desired, the interior surfaces of hopper side walls 12c, 12d can also be provided with such deflection shields to further facilitate the whirling action of the air flow within main collection bin 32.

The largest pieces of debris 20 fall onto floor 12e in bin 32 and the suction air, which still contains lighter particulate matter and fine dust particles (which may or may not be somewhat damp, depending upon the environmental conditions and type of sweeper being used), travels in the approximate direction of arrow E, upwardly through grid 38 to a vertical space 43 formed forwardly of wall 34 between it and another transversely disposed, vertical wall 44. Wall 44 extends continuously and uninterrupted entirely across the width of hopper 12 but is modified to permit passage therethrough of collection tube 30 at the upper right corner of the wall. Wall 44 extends continuously downwardly to its lowermost end where it terminates spacedly upward in relation to floor 12e.

Thus, dust-laden air, indicated by arrows F, passes downwardly between walls 34, 44 and may deposit some particles 22 on floor 12e at the area beneath the bottom of wall 44. Spaced forwardly of wall 44 there is another transversely extending wall 45 which intersects hopper side walls 12c, 12d, and which forms the front wall of a another bin 47, the bin sides being formed by the hopper side walls. Transverse wall 45 is preferably formed in three segments. Lowermost segment 45a is desirably fixed along its entire lower edge to floor 12e and extends continuously upwardly, substantially vertically until intersecting the lower edge of a forwardly and upwardly angled middle section 45b. Middle section 45b extends continuously until intersecting and being fixed at its upper transversely and horizontally disposed edge to the lower edge of a short vertically and transversely disposed segment 45c.

The rear wall of bin 47 is formed upwardly of wall 44. Because wall 44 terminates spacedly above floor 12e, small debris or dust 22 which falls within bin 47 is deposited immediately forwardly of hinged door 37 and passes therethrough under force of gravity when hopper 12 is tilted upwardly and rearwardly for emptying as described.

When hopper 12 is in its normally horizontal working position and fan 24 is operating, air in bin 47 continues upwardly and forwardly on the front side of wall 44, as illustrated by arrows G, toward an array of drum or "box" filters 46. The preferred structure, arrangement and attachment of filters 46 will be discussed in detail shortly hereafter.

The fan-pulled suction air, flowing at approximately 8,000 to 16,000 cfm, and preferably at 14,000 cfm, passes through the fluted sides of filters 46 (as indicated by arrows I), centrally therethrough (arrows J) and then out through the tops thereof into a plenum 48 formed between two subceilings 50, 52 which are positioned parallel to one another beneath roof 12a and parallel thereto, approximately 5.5 inches apart. The exact suction air flow rate used for optimal results will vary with the dimensions of the internal hopper structure and the number, size and placement of the filter units used therein.

Subceilings 50, 52 jut step-wise forwardly of the forwardmost row of filters 46. Lowermost wall 50 intersects the upper edge of transverse vertical segment 45c, and subceiling or "support plate" 52 extends slightly forwardly beyond wall 50 and intersects a short vertically disposed transverse wall 51 which extends downwardly and sealably connects to the uppermost end of fan inflow duct 26 so that plenum 48 opens into the inflow duct.

Thus the clean, filtered[air flow (indicated by arrows F) continues through fan 24 and out of sweeping device 10 via outflow duct 28, as indicated by arrows K.

Figure 2:
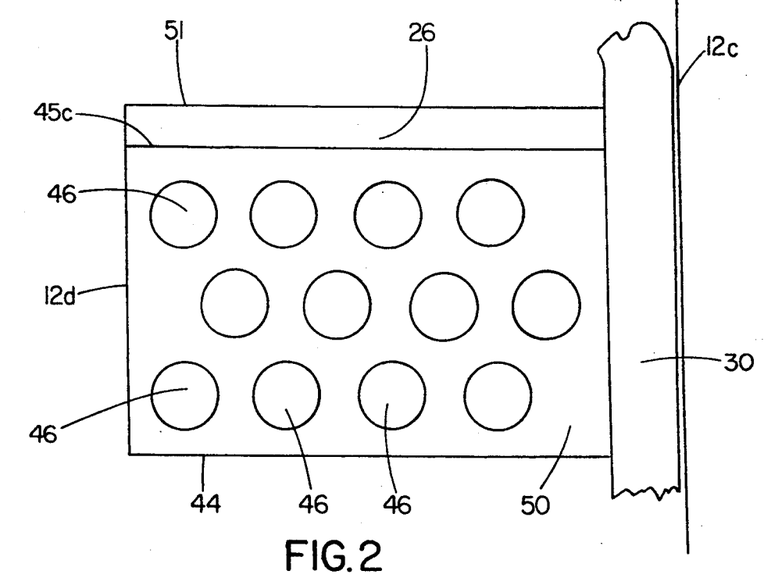
FIG. 2 is a top plan view schematically showing the arrangement of filters in the device of FIG. 1.
Figure 3:
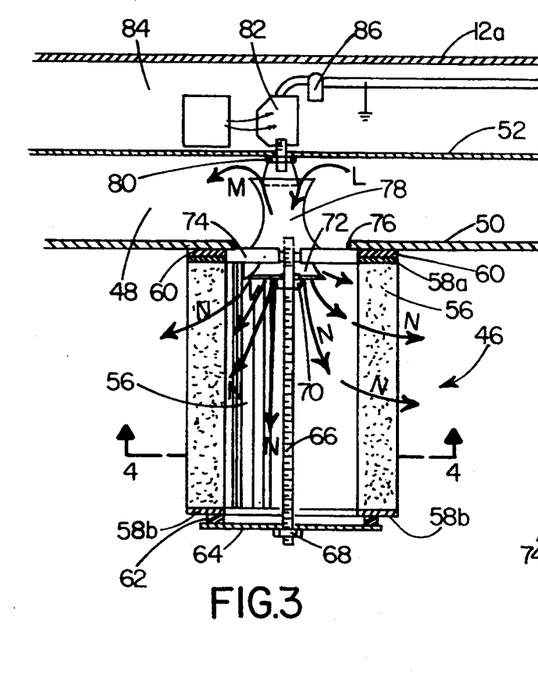
FIG. 3 is an enlarged, vertical sectional view through a portion of the device of FIG. 1, showing one of the filters and its attachment to the device and associated elements.
Figure 4:
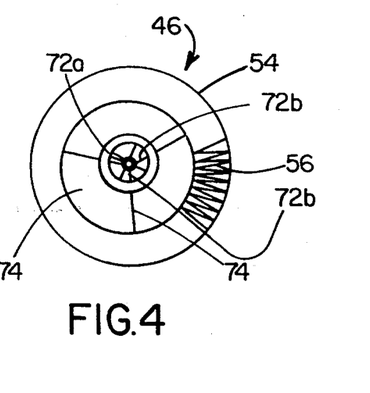
FIG. 4 is a transverse sectional view of a filter, taken on line 4—4 of FIG. 3, but showing the entire cross-section, schematically illustrating a portion of the filter media.

Regarding the preferred structure, placement and attachment of filters 46, attention is drawn to FIGS. 2, 3 and 4. FIG. 2 schematically illustrates the preferred placement of the individual filters, when viewed from above, the forward direction of the sweeping device being directed toward the top of the figure. Through a great deal of experimentation it has been found that, under the described preferred structural conditions, optimal air flow and purging of filters 46, indeed optimal overall performance of the entire new system, occurs when the filters to be described are positioned and spaced as shown.

Thus the preferred arrangement is in three rows of four filters each, arranged transversely, across hopper 12, beneath roof 12a, the rows being offset, so that the filters are staggered relative to an adjacent forwardly or rearwardly positioned filter, rather than being disposed one directly behind or in front of another, in columns. The filters are spaced apart, preferably six inches from every adjacent filter and at least four inches from an adjacent wall for the best possible performance. As is seen in FIG. 2, wall 51 is even further from the first row of filters because of the space formed at the attachment of fan inflow duct 26, seen from the side in FIG. 1, between wall segments 51 and 45c. Although a total of 12 filters gives optimal performance, six to 18 will suffice if sufficiently spaced apart.

FIG. 4 schematically illustrates the preferred general construction of each filter 46, having an outwardly disposed coarse mesh exterior 54 which circumferentially retains paper pleats 56 and preferably has a diameter of 12 inches, although a diameter ranging from 10 to 14 inches can be used with adequate results. Moreover, filters of other general shapes could also conceivably used with adequate results.

For clarity of the figures, only a portion of the total pleats 56 are indicated in the figures. Each filter 46 is preferably 16 inches high and has an interior nominal diameter of 8 inches. The especially preferred filters 46 are unique relative to previously known drum-type paper filters in that 160 such pleats two inches deep and 16 inches high are formed in each filter 46, providing a total of 10,240 square inches of filter media per filter. Previously about 210 pleats were customarily used in a 12 inch diameter filter, it being assumed that the increased surface area offered by the greater number of pleats would provide superior filtering.

Surprisingly, it has been discovered, however, that the reduced number of pleats 56 used in the present invention (80 to 160 of such pleats being preferred, and approximately 160 being especially preferred), in an otherwise identically-sized filter, actually permits more surface area of the filter paper to be exposed for more effective two-way air flow. In other words, in the known filter construction the pleats were too densely packed against one another, so the surface area present was not actually available for use. The described preferred spacial arrangement of filters and the decreased number of pleats 56 has also been found to improve purging to thereby clean the filters at regular intervals, as will be described further.

The increased space between the filters which is accomplished by using only six to 18 filters, and the preferred 12 filters, instead of the usual 20 to 24 used in a similar space, permits fine dust forced out of the filter pleats to settle by falling between the filters to the bin 47 below. It has been discovered that formerly, with closely positioned adjacent filters, purged dust was being forced by the purging blast of air from one filter into the next adjacent filter, thus reducing the efficiency of the entire purging operation.

FIGS. 3 and 4 further illustrate the structure of the attachment of each filter 46 and the new adaptation for purging same. The pleats of each filter 46 are sandwiched above and below between thin metal rings 58a, 58b which are open centrally. At the top of each filter 46 an annular rubber gasket 60 forms an air-tight seal between ring 58a and the lower surface of subceiling 50. Another annular rubber gasket 62 seals lower metal ring 58b against a round mounting plate 64 which blocks the otherwise open lower end of the associated filter 46.

Each round plate 64 is centrally penetrated by a threaded rod 66 which is preferably ½ inch in diameter and 21 inches long and which extends upwardly through mounting plate 64 and is connected thereto by a nut 68 positioned below mounting plate 64 to hold the associated filter upwardly against subceiling 50. Rod 66 continues upwardly and centrally through filter 46 and passes through another nut 70 through which it is threaded to form a rest for an air diffuser 72 disposed thereabove.

Diffuser 72 is shaped generally as a shallow, truncated cone, having a continuous side wall 72a with its largest diameter directed downwardly, as seen in FIG. 3, and its smallest diameter directed upwardly. At the lower end of the diffuser a "web" of inwardly directed spokes 72b which centrally intersect and are welded to a 9/16" diameter pipe which is colinearly disposed on rod 66 at a point just above nut 70.

The upwardly directed end of rod 66 continues upwardly beyond diffuser 72 and then is welded at a point adjacent to its upper end to the center ring of a spider ring 74 which is fixed, for example, by welding to the usual internal structure within the upper end of corresponding filter 46. Each spider ring 74 is spot welded to subceiling 50 at points such as those indicated at 76. Although the above arrangement is preferred for economy and simplicity, other methods of connecting filters 46 to subceiling 50 can certainly be conceived without departing from the scope of the invention.

Resting coaxially in relation to rod 66 upon the spokes of spider ring 74 is a Venturi tube 78 which opens downwardly directly above diffuser 72 and opens upwardly within plenum 48. The open upper end of Venturi tube 78 receives the outlet end of an air nozzle 80 which directs timed blasts of filter purging air into Venturi tube 78, as further described hereafter. Preferably Venturi tube 78 is approximately 4.2 inches high and has a three inch diameter at its narrowest point, approximately 2.8 inches from the bottom. At its bottom opening the tube is desirably 4.25 inches in diameter, with the diameter of the top opening being about four inches.

The plenum 48 within which Venturi tube 78 is housed is approximately 5.5 inches high. Thus there is a gap above the top of the tube of approximately 1.3 inches. There is also an air gap radially outward around the lower, outlet end of air nozzle 80 within the top of Venturi tube 78, so that blasts of purging air from nozzle 78 will create sufficient suction to cause air flow, indicated by arrow L to be pulled around the nozzle and into the tube. Contrariwise, when a particular filter is being used in the filtering mode, rather than being purged, air flow indicated by arrow M can pass upwardly through Venturi tube 78 and outwardly through the open top thereof.

Air nozzle 80 extends upwardly through plate 52 to which it is fixed, for example by welding or any other method to form an air tight seal therewith, and engages an air valve 82 which is disposed within an air space 84. Space 84 is formed parallel to and above plenum 48, between plate 52 and hopper roof 12a, and serves to house the air valves 82, as well as solenoids 86 and various wiring and other known electrical parts required for controlling the air valves. Space 84 also provides a passage for air line 88 (shown in part in FIG. 1) which carries purging air from tank 90 under pressure by compressor C, desirably at 78 cfm.

It has been found that by use of known electrical means including, for example, a stepped timer board (not shown), a particularly preferred purging and filtering cycle can be arranged in order to achieve maximum efficiency of overall system functioning. In the preferred cycle the filters are purged rotationally, one at a time for one half of a second, each filter 46 being purged approximately three times per minute. Thus, a purging blast of air occurs approximately 36 times per minute while the new system is being operated; each filter being purged approximately three times per minute.

Because fewer than normal filters are used in the new system each filter can be purged for a longer time than was previously possible. Also, because of the increased spacing between adjacent filters and the decreased number of pleats per filter each purging blast of air is more effective in removing dust from the filter media. It is to be understood that the suction force of the system caused by operation of fan 24 is on at all times the system is operating, so that during the one half second that any one filter is being purged all other eleven filters are still actively filtering fan-induced air flow. The purging air flow is illustrated, as an example, in FIG. 3 by arrows N.

Adding greatly to the efficiency of the purging operation, and therefor to the functioning of the overall system by reducing filter clogs, is air diffuser 72. As illustrated by arrows N, some of the purging air flow is caused by diffuser 72 to be "gentled", and as a result, forced outwardly toward the top and middle of the length of the pleats, rather than only blasting dust away from the bottom portion of the pleats as has formerly been the case. Thus, the entire filter, not just the bottom portion, becomes much more effectively cleaned with each purging blast of air from valve 82.

Without the diffuser, Venturi tube enhanced air pressure is approximately 70 pounds per psi of filter media, and in any case is of sufficient strength to overcome the force of the constantly flowing suction air. In known air filtration systems this non-diffused air blast was so strong that the majority of the air would travel directly to the bottom of the filter and the top one third to one half of the filter would remain clogged to the point of being non-functional. Eventually, the filtered material which had become caked upon the upper portion of the filter, externally thereof, would break loose, for example, under force of the vibration caused by normal operation of the sweeping device, and fall between the pleats and the external mesh.

So, after a relatively short period of use the lower area of the filters would become full with dust and have to be completely removed from the system to be manually cleaned. This filter cleaning operation of course required a great deal of time and manpower and greatly extended the time period in which a given area could be cleaned. Accordingly, it is clear that the efficacy of the new air filtration system is greatly enhanced by the addition of the diffuser beneath the Venturi tube.

As is made clear by the above description of the preferred embodiment of the new air filtration system, the new system includes a combination of features which work together to provide greatly enhanced air filtration of fugitive dust during industrial sweeping operations. Although these individual features each, in and of themselves are beneficial to the efficiency of such systems, it is only in combination that the greatest improvement in filter purging, and thus in suction air filtering occurs. Moreover, this efficient system operation is maintained continuously over extended periods of use without requiring periodic stopping and tearing down of the sweeper to manually clean the filters and has the result that the entire system operation is greatly enhanced.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. An air filtration system for use in capturing fugitive dust in industrial sweeping operations, the system comprising an enclosed hopper having internal structure for causing change in the direction of flow of suction air which enters the hopper along with debris collected during an industrial sweeping operation, a plurality of filters disposed within the hopper for filtering the suction air, each one of the plurality of filters having filter media therein which is repeatedly purged for cleaning and continuous reuse thereof, means for providing repeated purging blasts of air to the plurality of filters, means associated with each one of the plurality of filters for causing the purging blasts of air to clean substantially the entire filter media of each one of the filters, and means for creating suction air which is pulled through the hopper and the filters disposed therein before exit of the suction air from the hopper substantially free from debris, particulate matter and fugitive dust which is collected by the system, wherein the hopper is an enclosed hopper having a right side wall and a left side wall, with respect to the position of an operator of the system, a front wall and a rear wall, a floor and a roof, and wherein the internal structure in the hopper for causing change in direction of the suction air includes an arrangement of walls disposed within the hopper in transverse relationship to a longitudinal axis extending from the front wall to the rear wall, wherein the arrangement of walls included in the internal structure of the hopper for causing change in direction of suction air includes a first wall, a second wall and a third wall disposed in relationship to each other so as to cause the suction air flow to change in direction to such a degree as to, in combination with the effect of gravity, cause large pieces of debris and relatively smaller particulate matter to be removed from the flow of suction air prior to contacting the plurality of filters disposed within the hopper, wherein the first wall is positioned forwardly of the rear wall of the hopper and extends transversely between and intersects the right side wall and the left side wall of the hopper so as to form a bin within the hopper for collection of large pieces of debris which are taken into the system along with the suction air, the first wall terminating upwardly near, but not intersecting, the roof of the hopper and having positioned between and connecting the upper end of the first wall and the roof of the hopper a screen having mesh of sufficiently small size to prevent large pieces of debris from passing therethrough while being of sufficiently large size to permit passage therethrough with suction air of particulate matter and fine dust which is smaller than the debris collected in the bin, wherein the rear wall of the hopper includes an inside surface and an outside surface and wherein the first wall of the internal structure of the hopper includes a front surface and a back surface, the back surface facing the inside surface of the rear wall of the hopper on opposed front and back sides of the bin formed therebetween, and further comprising a first deflection shield and a second deflection shield, the first deflection shield being connected to the inside surface of the rear wall of the hopper and the second deflection shield being connected to the back surface of the first wall, the first deflection shield and the second deflection shield being spacedly positioned on the rear wall and the first wall, respectively, so as to open concavely toward each other, and being positioned relative to the flow of suction air which flows into the bin so as to cause the formation of an air vortex within the bin.

2. The system of claim 1, wherein the second wall is disposed parallel to and spacedly forward of the first wall so as to form a vertical passage therebetween, the second wall terminating spacedly upwardly from the floor of the hopper so that suctioned air first passes downwardly in front of the first wall, then passes beneath a lowermost end of the second wall and then passes upwardly in front of the second wall, to thereby cause particulate matter which is of such size as to pass through the screen connected at the top of the first wall to be deposited upon the floor of the hopper beneath the lowermost end of the second wall, forwardly of a lowermost end of the first wall, the lowermost end of the first wall including a hinged door which pivotally opens toward the bin formed between the first wall and the rear wall of the hopper when the hopper is selectively tilted upwardly and rearwardly to facilitate removal of collected debris and particulate matter therefrom.

3. The system of claim 2, and further comprising a first subceiling and a second subceiling disposed parallel and spaced apart in relation to one another and parallel to and spacedly beneath the roof of the hopper so as to form a first plenum and a second plenum parallel to one another beneath the roof of the hopper, the first subceiling being positioned beneath the second subceiling and providing a mounting site for the plurality of filters, the first plenum being formed above the first subceiling, and further wherein the third wall is disposed forwardly of the second wall transversely between and intersecting the right and left side walls of the hopper, the third wall extending from the floor of the hopper upwardly to and intersecting with the first subceiling to which the plurality of filters are mounted so as to form a chamber beneath the plurality of filters, the chamber being in air flow communication with the first plenum through the plurality of filters and the first plenum being in communication with the means for causing suction air, to thereby cause the suction air to be pulled over the first wall, then under the second wall and then upwardly through the plurality of filters, then through the first plenum, and through means for causing suction air before exiting the air filtration system.

4. The system of claim 1, wherein the plurality of filters are filters of the drum type suspended within the hopper and the filter media thereof is of the pleated paper type.

5. The system of claim 4, wherein each of the plurality of drum-type filters has a 12 inch exterior diameter and the pleated paper filter media of each of the plurality of filters is formed into from 80 to 160 pleats spacially evenly arranged around the perimeter of the corresponding filter.

6. The system of claim 5, wherein the plurality of filters comprises 12 filters arranged in three rows of four filters, each filter being radially spaced apart from every adjacent filter by a distance of at least six inches.

7. An air filtration system for use in capturing fugitive dust in industrial sweeping operations, the system comprising an enclosed hopper having internal structure for causing change in the direction of flow of suction air which enters the hopper along with debris collected during an industrial sweeping operation, a plurality of filters disposed within the hopper for filtering the suction air, each one of the plurality of filters having filter media therein which is repeatedly purged for cleaning and continuous reuse thereof, means for providing repeated purging blasts of air to the plurality of filters, means associated with each one of the plurality of filters for causing the purging blasts of air to clean substantially the entire filter media of each one of the filters, and means for creating suction air which is pulled through the hopper and the filters disposed therein before exit of the suction air from the hopper substantially free from debris, particulate matter and fugitive dust which is collected by the system, wherein the hopper is an enclosed hopper having a right side wall and a left side wall, with respect to the position of an operator of the system, a front wall and a rear wall, a floor and a roof, and wherein the internal structure in the hopper for causing change in direction of the suction air includes an arrangement of walls disposed within the hopper in transverse relationship to a longitudinal axis extending from the front wall to the reaf wall, wherein the arrangement of walls included in the internal structure of the hopper for causing change in direction of suction air includes a first wall, a second wall and a third wall disposed in relationship to each other so as to cause the suction air flow to change in direction to such a degree as to, in combination with the effect of gravity, cause large pieces of debris and relatively smaller particulate matter to be removed from the flow of suction air prior to contacting the plurality of filters disposed within the hopper, wherein the first wall is positioned forwardly of the rear wall of the hopper and extends transversely between and intersects the right side wall and the left side wall of the hopper so as to form a bin within the hopper for collection of large pieces of debris which are taken into the system along with the suction air, the first wall terminating upwardly near, but not intersecting, the roof of the hopper and having positioned between and connecting the upper end of the first wall and the roof of the hopper a screen having mesh of sufficiently small size to prevent large pieces of debris from passing therethrough while being of sufficiently large size to permit passage therethrough with suction air of particulate matter and fine dust which is smaller than the debris collected in the bin, wherein the second wall is disposed parallel to and spacedly forward of the first wall so as to form a vertical passage therebetween, the second wall terminating spacedly upwardly from the floor of the hopper so that suction air first passes downwardly in front of the first wall, then passes beneath a lowermost end of the second wall and then passes upwardly in front of the second wall, to thereby cause particulate matter which is of such size as to pass through the screen connected at the top of the first wall to be deposited upon the floor of the hopper beneath the lowermost end of the second wall, forwardly of a lowermost end of the first wall, the lowermost end of the first wall including a hinged door which pivotally opens toward the bin formed between the first wall and the rear wall of the hopper when the hopper is selectively tilted upwardly and rearwardly to facilitate removal of collected debris and particulate matter therefrom, and further comprising a first subceiling and a second subceiling disposed parallel and spaced apart in relation to one another and parallel to and spacedly beneath the roof of the hopper so as to form a first plenum and a second plenum parallel to one another beneath the roof of the hopper, the first subceiling being positioned beneath the second subceiling and providing a mounting site for the plurality of filters, the first plenum being formed above the first subceiling, and further wherein the third wall is disposed forwardly of the second wall transversely between and intersecting the right and left side walls of the hopper, the third wall extending from the floor of the hopper upwardly to and intersecting with the first subceiling to which the plurality of filters are mounted so as to form a chamber beneath the plurality of filters, the chamber being in air flow communication with the first plenum through the plurality of filters and the first plenum being in communication with the means for causing suctioned air, to thereby cause the suction air to be pulled over the first wall, then under the second wall and then upwardly through the plurality of filters, then through the first plenum, and through means for causing suction air before exiting the air filtration system, wherein the means for purging of the plurality of filters includes a source of high pressure air and a plurality of air nozzles connected to the source of high pressure air and connected to the second subceiling, one of the plurality of air nozzles being positioned above, and directed toward, a corresponding one of the plurality of filters, and a plurality of Venturi tubes, one Venturi tube disposed longitudinally and coaxially above a corresponding one of the plurality of filters beneath a corresponding air nozzle, for receiving a blast of high pressure air from the air nozzle and enhancing the volume of the blast of air and directing the air into the filter, and a plurality of air flow diffusers, one of the plurality of air flow diffusers disposed coaxially and longitudinally beneath each Venturi tube within a corresponding one of the plurality of filters to thereby soften the air blast and divert a portion of the purging air flow toward an upper portion of an inside of the filter, as well as permitting a portion of the purging blast of air to travel to a bottom of the corresponding filters.

8. The system of claim 7, and further comprising means for purging each one of the plurality of filters with a blast of air which lasts for one half second out of every 20 seconds of system operation and which causes the suction air flow to operate on all of the plurality of filters continually.

9. The system of claim 7, and further comprising means for providing each filter purging blast of air at approximately 78 cfm and for enhancing each blast by the corresponding Venturi tube to overcome the force of the suction air, and still further comprising means for providing the suction air of the system at approximately 14,000 to 16,000 cfm.

10. The system of claim 7, wherein the filtering means is a plurality of filters of the drum-type suspended within the hopper and the filter media thereof is of the pleated paper-type.

11. The system of claim 10, wherein each of the plurality of drum-type filters has a 12 inch exterior diameter and the pleated paper filter media of each of the plurality of filters is formed into from 80 to 160 pleats spacially evenly arranged around the perimeter of the corresponding filter.

12. The system of claim 11, wherein the first subceiling is provided with a plurality of apertures spaced apart from one another and arranged so that one of the plurality of apertures is disposed coaxially and beneath a corresponding air nozzle, and a plurality of spider rings, one of the plurality of spider rings being connected to the subceiling coaxially in relation to a corresponding one of the plurality of apertures in the first subceiling to thereby provide a mounting site from which each of the drum-type filters which are mounted to the first subceiling are suspended.

* * * * *

UNITED STATES PATENT AND TRADEMARK OFFICE
CERTIFICATE OF CORRECTION

PATENT NO. : 5,409,512

DATED : April 25, 1995

INVENTOR(S) : Wilkerson et al.

It is certified that error appears in the above-identified patent and that said Letters Patent is hereby corrected as shown below:

In the Claims:

Claim 7, Column 12, line 16, change "reaf" to read --rear--.

Signed and Sealed this

Twenty-seventh Day of June, 1995

Attest:

BRUCE LEHMAN

Attesting Officer

Commissioner of Patents and Trademarks